(12) United States Patent
Ho et al.

(10) Patent No.: US 7,148,935 B1
(45) Date of Patent: Dec. 12, 2006

(54) ON-BOARD ENTERTAINMENT SYSTEM ENTERTAINMENT DISPLAY RETRACTOR POSITION SENSOR

(75) Inventors: Chung Ho, Arcaida, CA (US); S. Scott Seeley, Corona, CA (US); Gerald E. Lester, Costa Mesa, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 919 days.

(21) Appl. No.: 09/652,241

(22) Filed: Aug. 31, 2000

(51) Int. Cl.
*H04N 5/64* (2006.01)

(52) U.S. Cl. .................. 348/837; 248/919; 248/922; 296/37.7; 307/10.1

(58) Field of Classification Search ............... 348/838, 348/837, 836; 224/311; 296/37.7; 248/917–923; 307/10.1; *H04N 5/64*
See application file for complete search history.

(56) References Cited

U.S. PATENT DOCUMENTS

| | | | | |
|---|---|---|---|---|
| 4,038,523 A | * | 7/1977 | Widmer et al. | 109/24.1 |
| 4,456,934 A | * | 6/1984 | Wedman et al. | 360/78.12 |
| 5,467,106 A | * | 11/1995 | Salomon | 345/87 |
| 5,768,647 A | * | 6/1998 | Coffin et al. | 396/428 |
| 5,811,791 A | * | 9/1998 | Portman | 250/221 |
| 6,452,155 B1 | * | 9/2002 | Sherlock et al. | 250/221 |

* cited by examiner

*Primary Examiner*—Michael H. Lee
(74) *Attorney, Agent, or Firm*—Nathan O. Jensen; Kyle Eppele

(57) ABSTRACT

A position sensor for determining the relative physical location of a movable item via a combination of a sensor and an indicator plate affixed to an actuator device.

12 Claims, 3 Drawing Sheets

ON-BOARD ENTERTAINMENT SYSTEM ENTERTAINMENT DISPLAY RETRACTOR POSITION SENSOR

BACKGROUND OF THE INVENTION

This invention relates to entertainment systems and more specifically to retractable display assemblies integrated into entertainment systems utilized on transportation vehicles.

Today's world involves numerous situations in which one is required to endure trips of varying distance and time for both pleasure and work reasons. To accomplish these travels a wide assortment of personal and commercial vehicles including automobiles, buses, ships, trains and aircraft are relied upon on a daily basis. For those individuals not operating the respective vehicle, the duration of the trip provides a captive situation which is often addressed by access to wireless broadcast information, such as television, or viewing pre-recorded information stored on the vehicle for playback during the trip. Such systems are often referred to as on-board entertainment system or mobile entertainment systems. With advances in electronics in recent years, with respect to size, cost and ruggedness, such on-board entertainment system entertainment systems are commonly found in numerous vehicles.

One drawback to the present day utilization of on-board entertainment system entertainment systems, is the maintenance associated with the display or monitor stowage and deployment. In order to provide maximum viewing access, the physical location of the display or monitor often subjects the device to excessive stress, both planar and rotational, when deployed. Additionally, the operating environment of such entertainment systems is often characterized by high vibration and deliberate, but uninformed attempts to deploy or retract the display.

During normal deployment and operation, certain conditions may arise that result in system operator desire to retract and stow the display assembly. Although the display assembly can be deployed manually, a typical on-board entertainment system on a large passenger vehicle, such as an aircraft, may utilize a large number of individual displays. A preferred method of deployment and storage is the minimization of user manipulation of display assembly location. Accordingly, a sensor assembly that is lightweight, low-cost, accurate and rugged that allows for the repetitive deployment and storage of the display assembly would be advantageous.

SUMMARY OF INVENTION

The present invention comprises a position sensor for determination of relative location of an item that is physically manipulated from a first location to one or more alternate locations in a controlled manner. In a preferred embodiment the position sensor comprised a indicator disk affixed to an actuator or moveable element, said indicator disk incorporating a "step" created by a region of varied diameter and a receive/transmit device contiguous to the path of movement of the step portion of said indicator disk. As the indicator disk travels contemporaneously with the controlled movement of the physically adjustable item, movement of a step region through the sensor channel creates a control signal, which may be coupled with intentional delay time, and subsequently triggering a signal to disable the actuator.

It is an object of the present invention to provide a device for controlling physical adjustment of a movable device.

It is an advantage of the present invention to provide an on-board entertainment system that incorporates a controlled display assembly deployment mechanism of varying position.

It is a feature of the present invention to utilize an indicator plate in combination with a step region relative to the deployed assembly location.

These and other objects, features, and advantages are disclosed in the specification, figures, and claims of the present invention.

DETAILED DESCRIPTION

Figure 1:
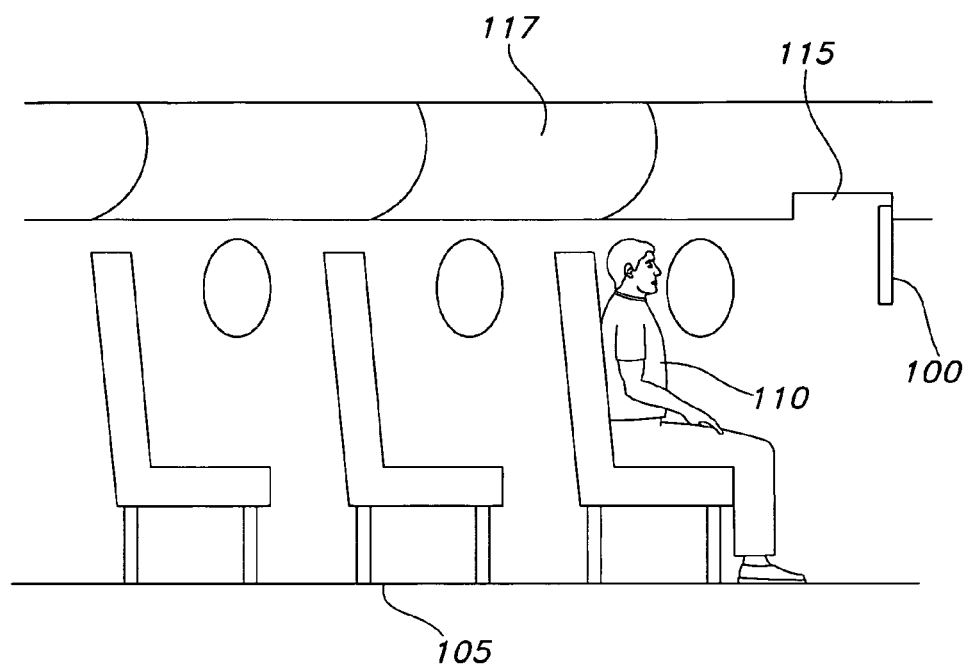
FIG. 1 is a diagrammatic view of the passenger compartment of a vehicle, which includes an on-board entertainment system having a deployed display.

Referring now to the drawings wherein like numerals refer to like matter throughout, FIG. 1 shows the display 100 of an entertainment/information system in the passenger portion of a vehicle 105, which incorporates the teachings of the present invention. The display is depicted in a deployed or extended position from its stowed location in cavity 115 of the ceiling panel 117 of the vehicle 105. Although not shown, the display assembly is coupled to additional components of the entertainment system for receiving power and content signals.

Figure 2:
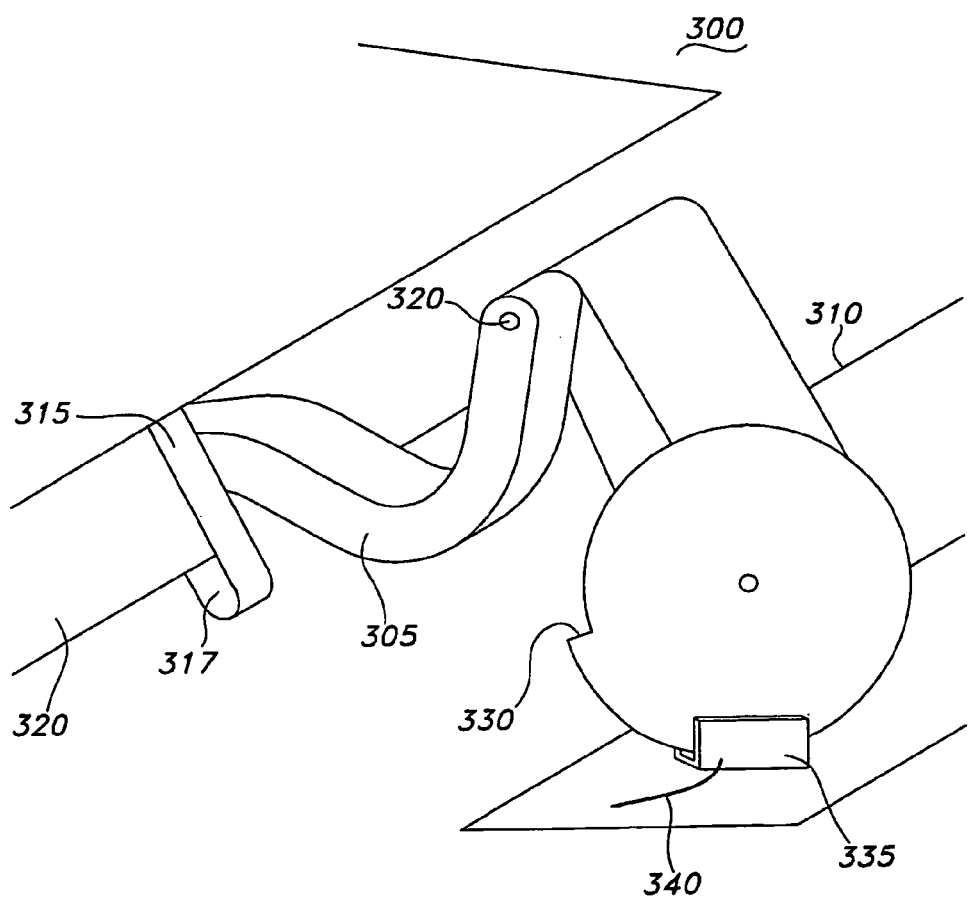
FIG. 2 is a perspective view of one embodiment of an on-board entertainment system display retract assembly incorporating the features of the present invention.

FIG. 2 depicts a perspective view of one embodiment of a display assembly 300 that incorporates the teachings of the present invention. The display assembly is comprised of an elongated lever arm 305 that is pivotally affixed, at a first distal region of said elongated lever arm to an actuator device 310. The actuator device, may be of any type consistent with the preferred design parameters, such as a linear or rotary motor. The display assembly further comprises an engagement arm 315, said engagement arm rigidly affixed to a display assembly 300 such that a defined portion of the engagement arm 317, extends beyond the perimeter of the edge of the display housing 320. As depicted a pivot pin 320 is utilized to accomplish the coupling of the lever arm 305 to the actuator 310, however it is understood that any type of common fastener device, including but not limited to rivets, screws, bolts, clips, adhesives or even an integrated clip mechanism, will equally satisfy the coupling task and accomplish the advantages of the present invention. An indicator plate or disk 330 is mechanically coupled to one end of the actuator 310 and rotates through a sensor or optical switch 335 that is generally "U" shaped, thereby providing a channel through which the indicator plate 330 travels during actuator movement. The sensor is electrically coupled to additional controller means (not shown) via cable 340 for transmission of a signal indicative of indicator wheel position.

Figure 3:
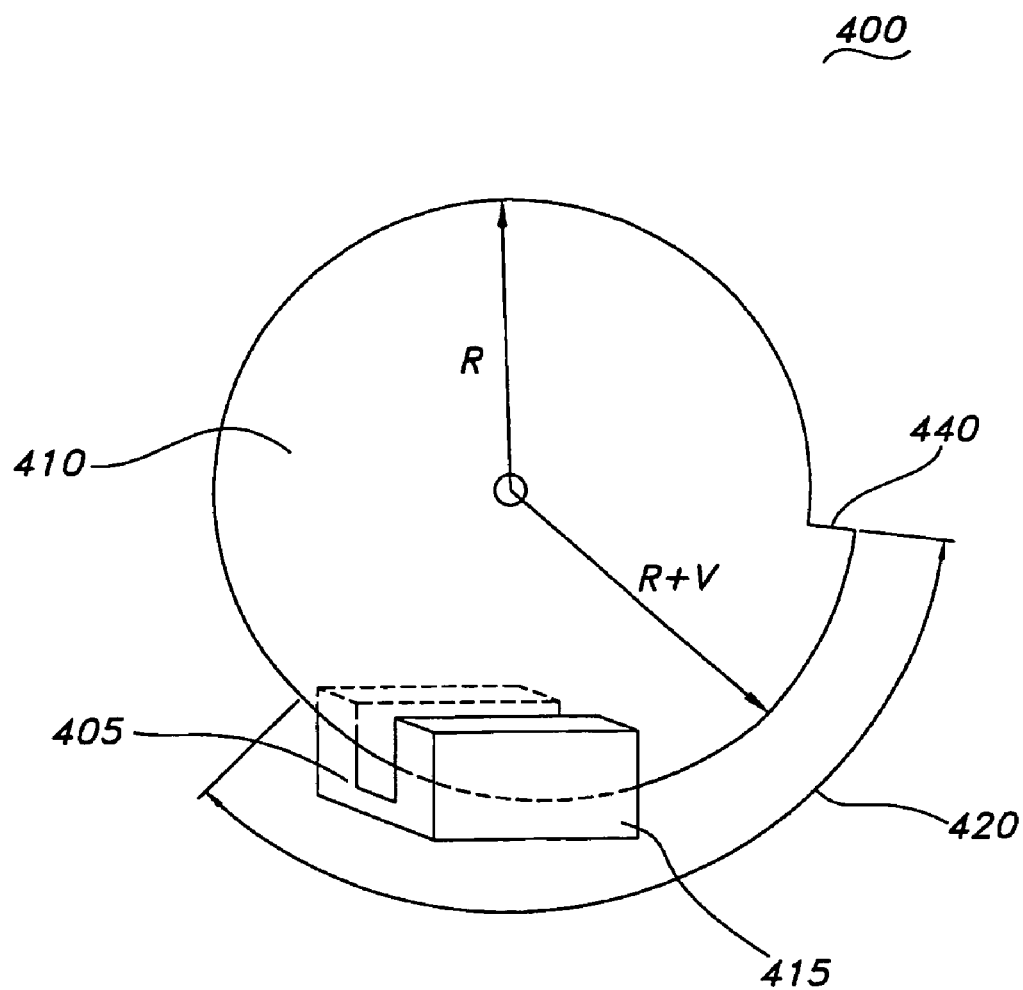
FIG. 3 is a perspective of one embodiment of the sensor and indicator plate of the present invention.

FIG. 3 is a perspective view of one embodiment of a sensor and indicator plate of the present invention. As shown, the sensor assembly 400 is comprised of a sensor device 405, an indicator plate 410 and cabling 415. The indicator plate is generally circular shaped having a primary radius of R and includes a step region defined by an increased radius of the disk R plus V, where V is a value that alters the radius R, either by increasing the radius over a given arc 420 of the indicator plate (as shown) or by decreasing the radius, resulting in a pronounced step or difference at the point on the edge of the indicator plate where V is maximized. The step dimension may be of varying size per design preference, a range of one eighth of an inch to three eight's of an inch would be consistent with an indicator plate having a two-inch diameter, exclusive of the varied diameter region. The region of increase diameter is defined by a prescribed arc of varying degrees, typically between one hundred twenty and forty degrees. It should also be noted that multiple step regions may be included on a given indicator plate. In the preferred embodiment of the present invention the arc having the displaced diameter comprised ninety degrees and yielded a "step" of approximately one quarter of an inch.

The sensor 405 includes a signal modulator, such as an LED or alternate source disposed upon a first vertical wall comprising one segment of the "U" and detector complementary located along a second vertical wall, such that in the absence of an obstruction in the channel formed by the first and second wall, the detector will be sensitive to the modulated signal. The channel formed by the sensor accommodates the indicator plate 410 in a contact-less fashion thereby allowing rotation of the indicator plate. Upon the passage of the step region, the detector senses the signal from the opposite sensor wall and generates a pulse signal provided to the actuator controller, to terminate further actuator movement. The signal to terminate additional motion may be additionally and varied delayed to comport with desired deployment control signals for associated final display assembly deployed condition.

In operation the operator of the on-board entertainment system enables, instantaneously or via delayed program, the movement of the display assembly at a predetermined time. For example, for short duration prior to takeoff, or after attainment of a certain altitude. The actuator device receives a command to relocate the current position of the display assembly to a second position from the on-board entertainment system control unit. In response to such command an enabling signal is conveyed to the actuator device. Simultaneous thereto, the sensor assembly modulator is provided a signal from the control unit to allow rotation until receipt of a cancellation signal that is triggered by the movement of the step region of the indicator plate through the sensor. In this manner the display assembly can be fully retracted, extended or adjusted within a predetermined increment consistent with the indicator plate movement step location with respect to the actuator/lever relationship.

In one embodiment of the present invention, the indicator plate is comprised of a flat aluminum disk approximately two inches in diameter and 0.02 inches in thickness. The disk is mounted on the extended shaft of a rotary actuator motor and has a receive-transmit infrared sensor along the edge of each primary face of the indicator plate, such that as the disk rotates, the portion of the perimeter edge that contains the step indicia passes through the detection region of the sensor. As the disk rotates on an axis that is parallel to the beam between the sensor the transmit beam is blocked or obstructed via the solid portion of the indicator plate. As the step region of the disk passes through the sensor the received pulses from the transmit region of the sensor are detected and monitored via signals provided from the sensor to the control unit. Upon attainment of such pulses, plus any additional latency desired by the operator and incorporated into the retract/deployment system, the actuator receives a signal to discontinue additional movement. It should be noted that alternative sensors, including mechanical, piezo-electric, or other optical sensors could readily be utilized by one of ordinary skill in the art, wishing to practice the present invention.

It is understood that, while the detailed drawings, specific examples, and particular values given describe preferred exemplary embodiments of the present invention, they are for the purpose of illustration only. The apparatus and method of the present invention is not limited to the precise details of the conditions disclosed. Accordingly, changes may be made to the details disclosed without departing from the spirit of the invention the scope of which should be determined by the following claims.

We claim:

1. A system for controlling the movement of a display assembly of an on-board entertainment system, comprising:
   an actuator for intended movement of said display assembly;
   an indicator plate mechanically affixed to the actuator, the indicator late being generally circular shaped including a step region;
   a sensor for sensing relative position of said indicator plate, said sensor including a signal modulator and a detector, said detector receiving a signal from said signal modulator upon passage of the step region of the indicator plate; and
   controller coupled to said actuator and sensor;
   wherein upon movement of a relative location of the indicator plate to a desired location, a control signal is transmitted to the actuator.

2. The system of claim 1, wherein the actuator is a rotary electric motor.

3. The system of claim 1, wherein the actuator is a linear electric motor.

4. The system of claim 2, wherein the indicator plate is a flat disk shaped device approximately two inches in diameter.

5. The system of claim 4, wherein the indicator plate is of metallic composition.

6. The system of claim 1, wherein the sensor is an infrared sensor.

7. The system of claim 1, wherein the sensor is a mechanical device.

8. A system for controlling the movement of a display assembly of an on-board entertainment system, comprising:
   an actuator, comprised of an electric rotary motor; for intended movement of said display assembly;
   an indicator plate mechanically affixed to an extension of the rotary motor shaft, the indicator plate being generally circular shaped including a step region;
   a sensor for sensing relative position of said indicator plate, said sensor including a signal modulator and a detector, said detector receiving a signal from said signal modulator upon passage of the step region of the indicator plate; and
   controller coupled to said actuator and sensor;
   wherein upon movement of a relative location of the indicator plate to a desired location, a control signal is transmitted to the actuator.

9. The system of claim 8, wherein the indicator plate is a flat disk shaped device approximately two inches in diameter.

10. The system of claim 9, wherein the indicator plate is of metallic composition.

11. The system of claim 1, wherein the sensor is an infrared sensor.

12. The system of claim 1, wherein the sensor is a mechanical device.

* * * * *